(12) United States Patent
Kim

(10) Patent No.: US 6,374,123 B1
(45) Date of Patent: Apr. 16, 2002

(54) USER TERMINALS INCLUDING CONDUCTORS THAT CONDUCT SIGNALS FROM INPUT DEVICES THEREIN AND METHODS OF PROVIDING INPUT VIA CONDUCTORS IN USER TERMINALS

(75) Inventor: Seung Kil Kim, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/425,647

(22) Filed: Oct. 22, 1999

(51) Int. Cl.[7] .................................................. H04B 1/38
(52) U.S. Cl. ......................... 455/556; 455/575; 345/173
(58) Field of Search ................................ 455/550, 556, 455/557, 575, 90, 566; 345/173

(56) References Cited

U.S. PATENT DOCUMENTS 6,208,879 B1 * 3/2001 Iwata et al. .................. 455/566
6,215,475 B1 * 4/2001 Meyerson et al. ........... 345/173
6,215,985 B1 * 4/2001 Tolvanen ....................... 455/90

* cited by examiner

*Primary Examiner*—Lee Nguyen
*Assistant Examiner*—Danh Le
(74) *Attorney, Agent, or Firm*—Myers Bigel Sibley & Sajovec

(57) ABSTRACT

A user terminal includes a first input device, such as a microphone, electrically coupled to a conductor, wherein the microphone applies an AC signal to the conductor in response to input thereto. A second input device is electrically coupled to the conductor, and the second input device applies one of a plurality of DC signals to the conductor in response to input thereto. A microphone signal can be coupled to the conductor, and automatically passed to or blocked from the conductor by DC level generated by the second input device. A DC detector circuit is coupled to the conductor, and the DC detector circuit determines the DC signal generated by the second input device. Related methods also are discussed.

27 Claims, 3 Drawing Sheets

USER TERMINALS INCLUDING CONDUCTORS THAT CONDUCT SIGNALS FROM INPUT DEVICES THEREIN AND METHODS OF PROVIDING INPUT VIA CONDUCTORS IN USER TERMINALS

FIELD OF THE INVENTION

The present invention relates to the field of user terminals in general, and more particularly, to input to user terminals.

BACKGROUND OF THE INVENTION

Some user terminals, such as radiotelephones, include a cover which is moveably coupled to the user terminal. For example, a cover of a radiotelephone can be moveably coupled to the radiotelephone by a hinge wherein the cover can be closed while the radiotelephone is inoperative and open while the radiotelephone is in use.

It is known to include components in the cover, wherein the components may provide input to the user terminal. For example, some radiotelephones include a microphone in the cover so that when the cover is open the microphone can be positioned near the user's mouth. Conductors may be used to carry the input from the components in the cover through the moveable coupling to the user terminal housing. Unfortunately, if additional input devices are provided on the cover of the user terminal, it may be difficult to route the conductors from the cover to the user terminal. For example, it may be difficult to route multiple conductors from the cover to the user terminal via a hinge that connects the cover to the user terminal. Consequently, a need exists for user terminals having improved structures and methods to provide input to the user terminal from movable covers.

SUMMARY OF THE INVENTION

It is, therefore, an object of the present invention to allow user terminals having improved input thereto.

It is another object of the present invention to allow a reduction in a number of conductors used to provide input to user terminals.

These and other objects of the present invention can be provide by user terminals that include a conductor that conducts electrical signals. A first input device is electrically coupled to a conductor, and the first input device applies an AC signal to the conductor in response to input thereto. A second input device is electrically coupled to the conductor, and the second input device applies one of a plurality of DC signals to the conductor in response to input thereto. An AC coupler circuit is coupled to the conductor. A DC detector circuit is coupled to the conductor, and the DC detector circuit determines the DC signal level generated by the second input device. Accordingly, coupling for a plurality of input devices can be provided through a common conductor. In one embodiment, the first input device can be a microphone, and the second input device can be a handwriting pad.

In a further aspect of the present invention, the user terminal can include a user terminal housing, wherein the AC coupler and the DC detector are housed within the user terminal housing and a cover housing, moveably coupled to the user terminal housing, wherein the first and second input devices are housed within the cover housing. By coupling the first and second input devices in the cover through a common conductor, a number of conductors between the cover and the housing can be reduced.

Accordingly, AC and DC signals can be applied to a first conductor as a result of respective first and second inputs. The AC and DC signals are provided to the AC coupler circuit and DC detector, respectively. The AC coupler circuit and DC detector can determine the inputs based on determinations from the combined signal on the first conductor. Accordingly, the number of conductors needed to carry the inputs from a cover housing to the radiotelephone housing may be reduced. In particular, methods and systems according to the present invention can be used advantageously in radiotelephones including flip covers.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects. Although the present invention is described herein by reference to a radiotelephone, it will be understood that the present invention may be practiced with any user terminal in which input is provided via conductors.

Figure 1A:
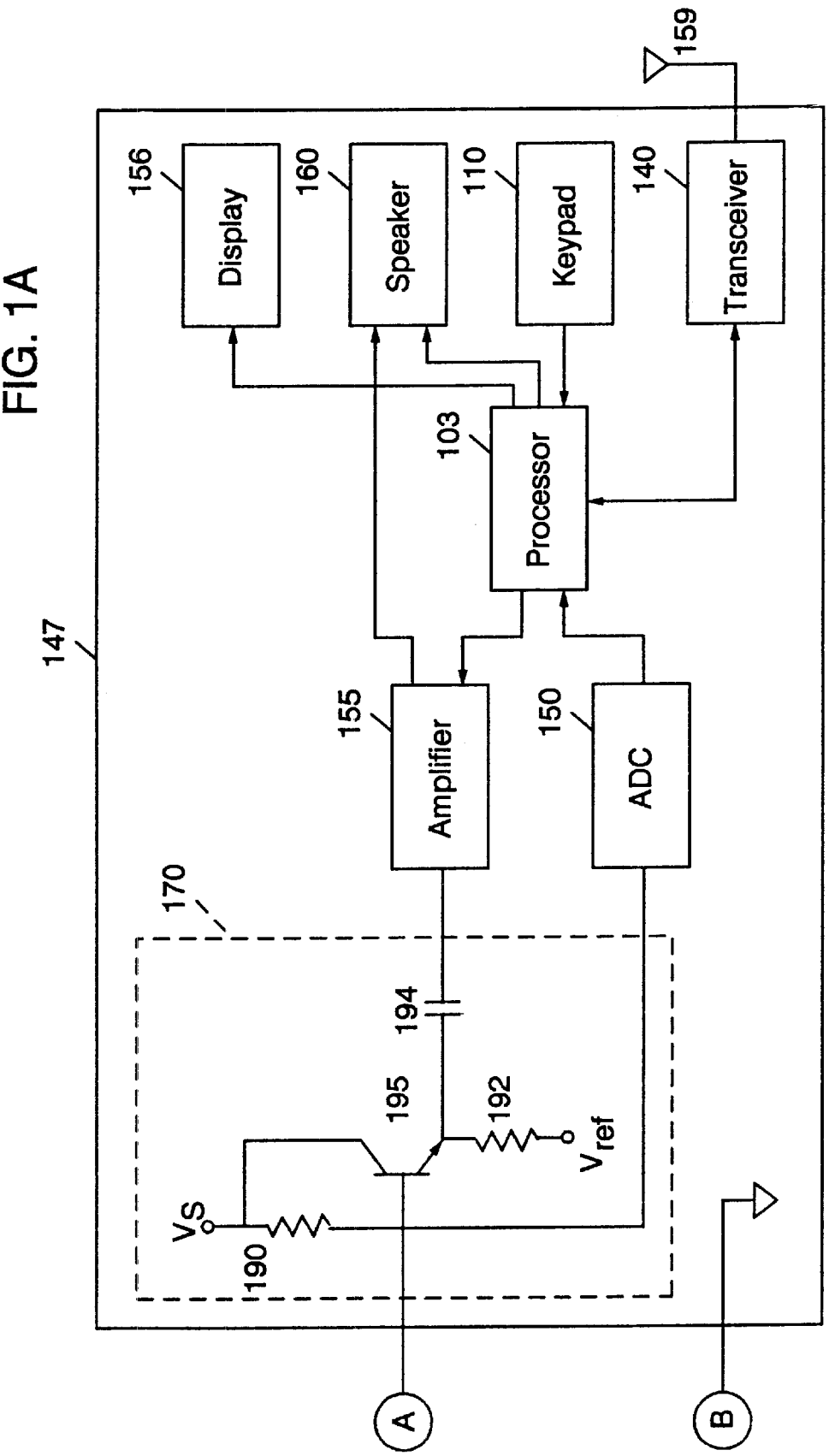
FIG. 1A is a block diagram in an embodiment of an AC coupler circuit, a DC detector and other radiotelephone components according to the present invention.

FIG. 1A is a block diagram of an embodiment of a radiotelephone 101 according to the present invention. The radiotelephone 101 can be used to communicate within a wireless communications system such as a cellular radiotelephone communications system and/or a satellite radiotelephone communications system.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems, such as those conforming to the North American standard IS-54 and the European standard GSM, have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data).

As shown in FIG. 1A, the radiotelephone 101 includes a keypad 110 which can be used to provide input to the radiotelephone 101. The keypad 110 can include a plurality of keys that provide input to the radiotelephone 101 when pushed. For example, when the user wishes to initiate a call in the communications system, the user pushes a series of keys that correspond to the number to be dialed. The user may listen to a speaker 160 that produces audio signals generated by the radiotelephone 101 from communication signals received by the radiotelephone 101 during a call. The radiotelephone 101 transmits and receives the communication signals via a transceiver 140 over an antenna 159.

During operation, the user may refer to a display 156 of the radiotelephone 101 to observe information relevant to the operation of the radiotelephone 101, such as characters or numbers. For example, the display 156 can be a black and white Liquid Crystal Display (LCD) that displays for example, a telephone number entered by the user or a name stored in the radiotelephone 101. The display 156 may also be used in conjunction with the keypad 110 such as when the user dials a number to place a call.

Figure 2:
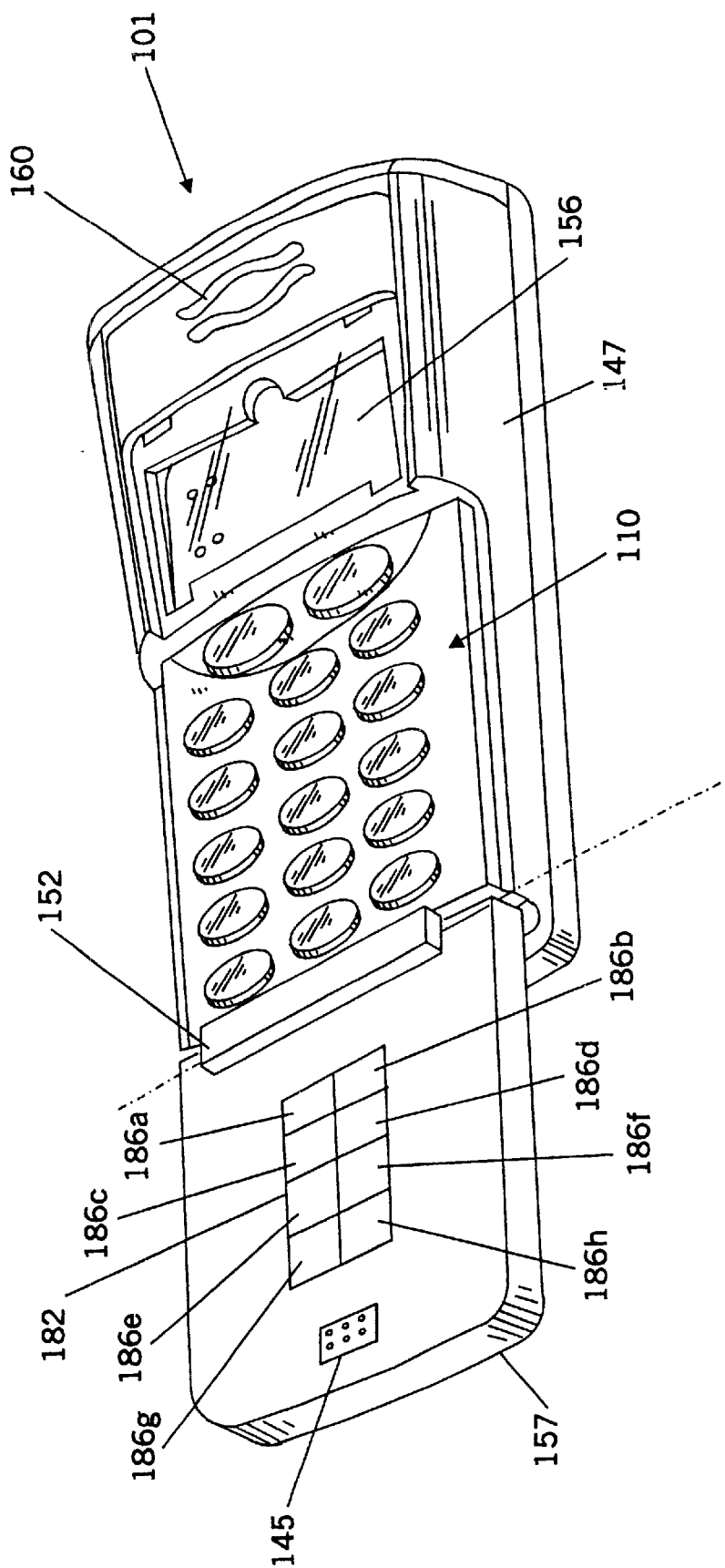
FIG. 2 is a perspective view of a radiotelephone housing and a cover housing according to the present invention.

A processor 103 provides the communications signals to the transceiver 140 for transmission and receives the communications signals from the transceiver for reception. For example, the processor 103 receives communications signals from the transceiver 140 for the reproduction of audio through the speaker 160. The processor 103 may also generate characters for display on the display 156. For example, the processor 103 may generate numbers for display when the user enters a telephone number on the keypad 110. The characters can alternatively be generated by a character generator which is not shown. The speaker 160, keypad 110, display 156, processor 103, and the transceiver 140 can be located within a radiotelephone housing 147. A cover housing 157 can be movably coupled to the radiotelephone housing 147 via a hinge 152 as shown in FIG. 2.

Figure 1B:
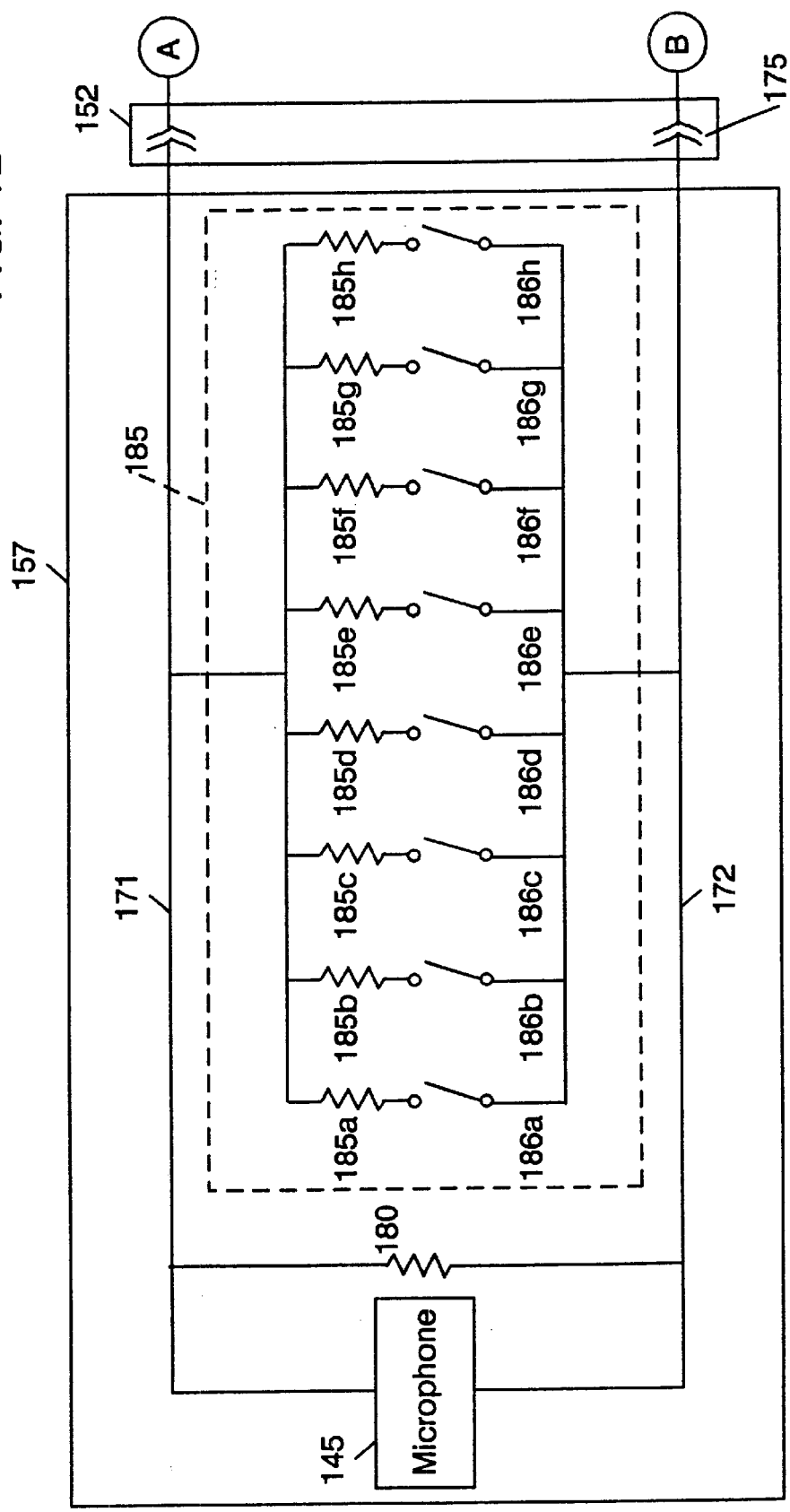
FIG. 1B is a block diagram of an embodiment of a first and second input devices such as a radiotelephone according to the present invention.

As shown in FIG. 1B, the cover housing 157 includes a microphone 145. During a call, the user can speak into the microphone 145 causing the radiotelephone 101 to generate communication signals which are transmitted from the radiotelephone 101. The microphone 145 is electrically coupled to a first conductor 171 and a second conductor 172. A first resistor 180 is electrically coupled between the first and second conductors 171, 172 in parallel with the microphone 145. The microphone 145 provides a first input device in the cover housing 157 of the radiotelephone 101 and generates an AC signal in response to audio input to the microphone 145. The AC signal is applied to the first conductor 171.

A resistor network 185 provides a second input device and includes a plurality of second resistors 185a–h which are each electrically coupled in series to a plurality of respective switches 186a–h. The series combination of each of the plurality of resistors 185a–h and the plurality of switches 186a–h is electrically coupled in parallel between the first and second conductors 171, 172. The resistor network 185 can provide an input device, such as a handwriting pad 182, through which handwritten messages may be provided to the radiotelephone 182. The resistor network 185 generates one of a plurality of DC signals in response to a closure of one of the respective switches 186a–h. The one of a plurality of DC signals is applied to the first conductor 171. Accordingly, the AC signal generated by the microphone 145 and the DC signal generated by the resistor network 185 are both applied across the first and second conductors 171, 172. In other words, the first conductor 171 provides a signal line and the second conductor provides a reference (such as ground) line so that signals can be referred to as being applied to the first conductor 171.

Handwritten input to radiotelephones is discussed, for example in U.S. patent application Ser. No. 09/425,637 filed concurrently herewith, to Kim entitled Handwritten Character Recognition Devices and Electronic Devices Incorporating Same which is commonly assigned to the assignee of the present invention. The disclosure of the above—referenced application is incorporated herein by reference in its entirety. For example, the handwriting pad 182 can provide input to the radiotelephone 101 in response to a user's handwritten strokes on the surface of the handwriting pad 182. Pressure on a series of areas of the handwriting pad 182 from the handwritten strokes can cause a series of the plurality of switches 186a–h associated with the areas having pressure applied to close. Accordingly, the series of switch 186a–h closures causes a respective series of DC signals to be applied to the first conductor 171.

The first and second conductors are preferably provided from the cover housing 157 through the hinge 152 to the radiotelephone housing via a connector 175. The first conductor 171 is electrically coupled to a third resistor 190 in the radiotelephone housing 147. The first resistor 180 (in the cover housing) and the third resistor 190 define a biasing circuit that cooperates with the resistor network 185 (in the cover housing) to generate a bias signal when all of the switches 186a–h are open. In particular, a power supply voltage level Vs is applied across the third resistor 190, the first resistor 180, and the resistor network 185. The second conductor 172 can provide a reference voltage level for the signal applied to the first conductor 171. The second conductor 172 can be, for example, provided to the user terminal housing 147 via the connector 175, wherein the second conductor 172 is electrically coupled to a ground terminal in the user terminal housing 147.

When none of the plurality of switches 186a–h in the resistor network 185 is closed, the series combination of the first resistor 180 and the third resistor 190 form a voltage divider which produces a first DC signal (bias signal) on the first conductor 171. When one of the plurality of switches 186a–h in the resistor network 185 is closed, the one of the plurality of respective resistors 185a–h electrically coupled in series with the closed switch 186a–h is electrically coupled in parallel with the first resistor 180. Accordingly, a second voltage level is produced on the first conductor 171, wherein the second voltage level is less than the first voltage level.

When input is provided to the microphone 145, the AC signal produced by the microphone 145 is applied to the first conductor 171. It will be understood that the AC signal produced by the microphone 145 and the DC signal produced by the first and third resistors 180, 190 and the resistor network 185 can be applied to the first conductor 171 to produce input to the radiotelephone that includes both the AC signal and the DC signal. However, the AC signal level may be very low, for example in the microvolt range, so it may have relatively little affect on the DC voltage level.

Referring again to FIG. 1A, an Analog to Digital Convertor (ADC) 150 in the radiotelephone housing 147 determines the DC signal on the first conductor 171. In particular, the respective values of the resistors 185a–185h can be selected to provide respective DC signals having magnitudes which can be determined from one another by the ADC 150. For example, the resistor 185a can be selected to provide a first DC signal which is greater than a second DC signal produced by the resistor 185b. The ADC 150 converts the DC signal from an analog format to a digital format and provides the digital format of the DC signal to the processor 103. The processor 103 determines which switch is closed based on the value of the digital format of the DC signal.

In operation, a bias signal is applied to the first conductor 171 by the resistors 180 and 190 when all of the switches 186a–186h are open. By selecting resistances for each of resistors 185a–185h such that 185>185b>185c. . . >185h, closing switch 186a will result in a first DC signal less than the bias signal, closing switch 186b will result in a second DC signal less than the first DC signal closing switch 186c will result in a third DC signal less than the second DC signed, closing the switch 186d will result in a fourth signal less than the third DC signed, closing the sixth 186e will result in a fifth DC signal less than the fourth DC signal, closing switch 186f will result in a sixth DC signal less than the fifth DC signal, closing switch 186g will result in a seventh PC signal less than the sixth DC signed, and closing switch 186h will result in an eighth DC signal less than the seventh PC signal.

An AC coupler circuit 170 in the radiotelephone housing 147 is electrically coupled to the first conductor 171 and passes the AC signal on the first conductor 171. The detector circuit 170 includes a Bipolar Junction Transistor (BJT) 195, a fourth resistor 192 and, a capacitor 194, and an amplifier 155. The first conductor 171 is electrically coupled to a base electrode of the BJT 195. The fourth resistor is electrically coupled between an emitter electrode of the BJT 195 and a second voltage reference Vref. A collector electrode of the BJT 195 is electrically coupled to the supply voltage level Vs. It will be understood that other AC coupler circuits 170 can be used.

In operation, when none of the plurality of switches 186a–h in the resistor network 185 is closed, the voltage level on the first conductor 171 forward biases the base-emitter junction of the BJT 195, (which may be configured as an emitter follower), thereby passing the AC and bias signals to capacitor 194. The capacitor 194 passes the AC signal which is amplified by an amplifier 155, and the capacitor blocks the bias signal. The amplified AC signal determined by the circuit 170 and amplified by amplifier 155 is provided to the speaker 160.

When one of the plurality of switches 186a–h in the resistor network 185 is closed, the voltage level on the first conductor 171 is reduced by the addition of the selected resistor 185a–h in parallel with the first resistor 180 so that the base-emitter junction of the BJT 195 is not forward biased. Accordingly, the transistor circuit 170 blocks the AC signal from the amplifier 155 whereupon the processor 103 does not receive the AC signal.

In one embodiment, for example, the second reference voltage Vref is selected to be about 0.7 Volts less than the voltage level at the base electrode of the BJT 195 when none of the switches 186a–h is closed. Each of the values of the resistors 185a–h is selected to reduce the voltage level at the base-emitter junction of the BJT 195 by at least about 0.3 Volts when the respective switch 186a–h is closed so that the base-emitter junction of the BJT 195 is not forward biased. Input from the microphone to the processor can thus be turned off automatically when input is provided to the resistor network.

According to the present invention, AC and DC signals are applied to a first conductor as a result of respective first and second inputs. The AC and DC signals are provided to an AC coupler circuit and a DC detector, respectively. The AC coupler circuit and DC detector can determine the inputs based on determinations from the combined signal on the first conductor. Accordingly, the number of conductors needed to carry the inputs from a cover housing to the radiotelephone housing may be reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A user terminal comprising:
   a conductor that conducts electrical signals;
   a first input device, electrically coupled to the conductor, wherein the first input device applies an AC signal to the conductor in response to input thereto;
   a second input device, electrically coupled to the conductor, wherein the second input device applies one of a plurality of DC signals to the conductor in response to input thereto;
   an AC coupler circuit, coupled to the conductor, wherein the AC coupler circuit determines the AC signal applied by the first input device to the conductor; and
   a DC detector circuit, coupled to the conductor, wherein the DC detector circuit determines the DC signal generated by the second input device.

2. A user terminal according to claim 1 further comprising:
   a bias circuit, coupled to the conductor, wherein the bias circuit applies a bias signal on the conductor when the second input device does not apply one of the plurality of DC signals to the conductor.

3. A user terminal according to claim 2, wherein the bias circuit comprises a passive circuit.

4. A user terminal according to claim 1 further comprising:
   a user terminal housing, wherein the AC coupler circuit and the DC detector are housed within the user terminal housing; and
   a cover housing, moveably coupled to the user terminal housing, wherein the first and second input devices are housed within the cover housing.

5. A user terminal according to claim 1, wherein the AC coupler circuit comprises a capacitor that passes the AC signal applied by the first input device and that blocks DC signals.

6. A user terminal according to claim 1, wherein the AC coupler circuit comprises a gate circuit coupled to the conductor that blocks the AC signal when the second input device applies one of the DC signals to the conductor.

7. A user terminal according to claim 1, wherein the DC detector comprises an analog-to-digital converter electrically coupled to a user terminal processor.

8. A user terminal according to claim 1, wherein the first input device comprises a microphone.

9. A user terminal according to claim 1, wherein the second input device comprises a plurality of switch and resistor pairs coupled to the conductor wherein the switch and resistor pairs are coupled in parallel.

10. A user terminal according to claim 1, wherein the second input device comprises a writing pad.

11. A user terminal according to claim 1, wherein the user terminal comprises a radiotelephone.

12. A method of providing input to a user terminal, the method comprising:
    applying an AC signal to a conductor in response to input to a first input device;
    applying one of a plurality of DC signals to the conductor in response to input to a second input device;

determining the AC signal applied to the conductor by the first input device; and determining the DC signal applied by the second input device.

13. A method according to claim 12 further comprising:

applying a bias signal on the conductor when the second input device does not generate one of the plurality of DC signals on the conductor.

14. A method according to claim 12, wherein the step of determining the AC signal comprises the step of passing the AC signal applied by the first input device and blocking DC signal.

15. A method according to claim 12, wherein the step of determining the DC signal comprises the step of converting the DC signal from an analog format to a digital format.

16. A user terminal comprising:

means for applying an AC signal to a conductor in response to input to a first input device;

means for applying one of a plurality of DC signals to the conductor in response to input to a second input device;

means for determining the AC signal applied to the conductor by the first input device; and means for determining the DC signal applied by the second input device.

17. A user terminal according to claim 16 further comprising:

means for applying a bias signal on the conductor when the second input device does not generate one of the plurality of DC signals on the conductor.

18. A user terminal according to claim 16, wherein the means for determining the AC signal comprises means for passing the AC signal applied by the first input device and blocking the DC signals.

19. A user terminal according to claim 16, wherein the means for determining the DC signal comprises means for converting the DC signal from an analog format to a digital format.

20. A radiotelephone comprising:

a conductor that conducts electrical signals;

a microphone, electrically coupled to the conductor, wherein the microphone applies an AC signal to the conductor in response to input thereto;

a second input device, electrically coupled to the conductor, wherein the second input device applies one of a plurality of DC signals to the conductor in response to input thereto;

an AC coupler circuit, coupled to the conductor, wherein the AC coupler circuit determines the AC signal applied by the microphone to the conductor;

a DC detector circuit, coupled to the conductor, wherein the DC detector circuit determines the DC signal applied by the second input device;

a radiotelephone housing, wherein the AC coupler circuit and the DC detector are housed within the radiotelephone housing; and a cover housing, moveably coupled to the radiotelephone housing, wherein the first and second input devices are housed within the cover housing.

21. A radiotelephone according to claim 20 further comprising:

a bias circuit, coupled to the conductor, wherein the bias circuit applies a bias signal on the conductor when the second input device does not generate one of the plurality of DC signals on the conductor.

22. A radiotelephone according to claim 21, wherein the bias circuit comprises a passive circuit.

23. A radiotelephone according to claim 20, wherein the AC coupler circuit comprises a capacitor that passes the AC signal applied by the microphone and that blocks DC signals.

24. A radiotelephone according to claim 20, wherein the AC coupler circuit comprises a gate circuit coupled to the conductor that blocks the AC signal when the second input device generates one of the DC signals on the conductor.

25. A radiotelephone according to claim 20, wherein the DC detector comprises an analog-to-digital converter electrically coupled to a radiotelephone processor.

26. A radiotelephone according to claim 20, wherein the second input device comprises a plurality of switch and resistor pairs coupled to the conductor wherein the switch and resistor pairs are coupled in parallel.

27. A radiotelephone according to claim 20, wherein the second input device comprises a writing pad.

* * * * *